(12) United States Patent
Chen et al.

(10) Patent No.: US 10,137,824 B2
(45) Date of Patent: Nov. 27, 2018

(54) ADAPTIVE LED MULTI-MODULE HEADLAMP WITH INTEGRATED DIPPED BEAM AND HIGH BEAM

(71) Applicant: GUANGDONG RAYTON INTELLIGENT OPTO. CO., LTD, Guangdong (CN)

(72) Inventors: Huanjie Chen, Guangdong (CN); Zhiwei Shi, Guangdong (CN); Denong Xu, Guangdong (CN); Debin Qin, Guangdong (CN)

(73) Assignee: GUANGDONG RAYTON INTELLIGENT OPTO. CO., LTD, Guangdong (CN)

( * ) Notice: Subject to any disclaimer, the term of this patent is extended or adjusted under 35 U.S.C. 154(b) by 0 days.

(21) Appl. No.: 15/532,508

(22) PCT Filed: Jul. 14, 2016

(86) PCT No.: PCT/CN2016/089990
§ 371 (c)(1),
(2) Date: Jun. 2, 2017

(87) PCT Pub. No.: WO2017/210959
PCT Pub. Date: Dec. 14, 2017

(65) Prior Publication Data
US 2018/0186279 A1    Jul. 5, 2018

(30) Foreign Application Priority Data
Jun. 8, 2016 (CN) .......................... 2016 1 0404939

(51) Int. Cl.
*B60Q 1/14* (2006.01)
*B60Q 1/00* (2006.01)
(Continued)

(52) U.S. Cl.
CPC ......... *B60Q 1/1423* (2013.01); *B60Q 1/0029* (2013.01); *B60Q 1/0035* (2013.01);
(Continued)

(58) Field of Classification Search
CPC .......... B60Q 2300/41; B60Q 2300/056; B60Q 2300/45; B60Q 1/143; B60Q 2300/3321;
(Continued)

(56) References Cited

U.S. PATENT DOCUMENTS 6,943,947 B2 *   9/2005   Adachi ................ G02B 3/0012
                                                     348/E9.027
7,173,760 B2 *   2/2007   Adachi ................ G02B 3/0012
                                                     345/104
(Continued)

*Primary Examiner* — Tung X Le
*Assistant Examiner* — Borna Alaeddini
(74) *Attorney, Agent, or Firm* — JCIPRNET

(57) ABSTRACT

An adaptive LED multi-module headlamp with integrated dipped beam and high beam includes a dipped beam and high beam following-up adaptive beam pattern control system, a light compensation system, and a color temperature control system; the dipped beam and high beam following-up adaptive beam pattern control system comprising a LED light source module array, the LED light source module array comprising a number of LED light source modules including more than two LED light source modules parallel to each other which forming a direct light source, axes of the more than two LED light source modules paralleling with the center of vehicle body, and including more than one LED light source module arranged outside the direct light source which forming a steering light source, angle between axes of the more than one LED light source module and the center of vehicle body being acute angle, the angle between axes of the LED light module of the steering light source and vehicle body increasing in turn from inside out. A dipped beam and high beam spot during driving straight and following-up beam pattern while turning can be achieved to get a better (Continued)

illumination angle by arranging multiple independent LED light source modules as a headlamp and by controlling different LED light source modules to be lighted during driving straight or turning.

6 Claims, 10 Drawing Sheets

(51) Int. Cl.
F21S 41/255 (2018.01)
F21S 41/25 (2018.01)
F21S 41/141 (2018.01)
F21S 41/32 (2018.01)

(52) U.S. Cl.
CPC .......... B60Q 1/0041 (2013.01); F21S 41/141 (2018.01); F21S 41/25 (2018.01); F21S 41/255 (2018.01); F21S 41/32 (2018.01); B60Q 2300/054 (2013.01); B60Q 2300/056 (2013.01); B60Q 2300/42 (2013.01)

(58) Field of Classification Search
CPC ............ B60Q 2300/40; B60Q 2300/42; B60Q 1/0023; B60Q 1/06; B60Q 1/085; B60Q 2300/124; B60Q 1/0076; B60Q 1/04; B60Q 2300/054; F21S 41/00; F21S 41/10; F21S 41/20; F21S 41/30; F21S 41/60; F21S 41/12; F21S 41/125; F21S 41/141; F21S 41/18; F21S 41/19; F21S 41/192

See application file for complete search history.

(56) References Cited

U.S. PATENT DOCUMENTS

| | | | | |
|---|---|---|---|---|
| 7,850,350 | B2* | 12/2010 | Weller | B60Q 1/2665 |
| | | | | 362/494 |
| 8,004,622 | B2* | 8/2011 | Schultz | G02B 27/2214 |
| | | | | 349/15 |
| 8,070,337 | B2* | 12/2011 | Ajiki | F21S 48/1154 |
| | | | | 362/511 |
| 9,102,281 | B2* | 8/2015 | Rodriguez Barros | B60R 1/082 |
| 9,140,424 | B2* | 9/2015 | Mochizuki | F21S 48/17 |
| 9,611,997 | B2* | 4/2017 | Bauer | B60Q 1/085 |
| 2004/0051945 | A1* | 3/2004 | Adachi | G02B 3/0012 |
| | | | | 359/453 |
| 2006/0023461 | A1* | 2/2006 | Knight | B60Q 1/076 |
| | | | | 362/466 |
| 2008/0080201 | A1* | 4/2008 | Specht | F21S 41/143 |
| | | | | 362/507 |
| 2010/0110711 | A1* | 5/2010 | Ookubo | F21S 41/147 |
| | | | | 362/514 |
| 2010/0165653 | A1* | 7/2010 | Ookubo | F21V 13/02 |
| | | | | 362/539 |
| 2010/0194276 | A1* | 8/2010 | Okubo | F21V 29/76 |
| | | | | 315/82 |
| 2013/0169154 | A1* | 7/2013 | Kay | B60Q 1/12 |
| | | | | 315/81 |
| 2014/0362600 | A1* | 12/2014 | Suckling | F21S 48/1225 |
| | | | | 362/583 |
| 2015/0043236 | A1* | 2/2015 | Yamamoto | F21S 41/19 |
| | | | | 362/516 |
| 2015/0146440 | A1* | 5/2015 | Lee | B60Q 1/0041 |
| | | | | 362/465 |

* cited by examiner

ADAPTIVE LED MULTI-MODULE HEADLAMP WITH INTEGRATED DIPPED BEAM AND HIGH BEAM

CROSS-REFERENCE TO RELATED APPLICATION

This application is a 371 of international application of PCT application serial no. PCT/CN2016/089990, filed on Jul. 14, 2016, which claims the priority benefit of China application no. 201610404939.3, filed on Jun. 8, 2016. The entirety of each of the above-mentioned patent applications is hereby incorporated by reference herein and made a part of this specification.

FIELD OF THE INVENTION

The present invention relates to LED, particularly to an adaptive LED multi-module headlamp with integrated dipped beam and high beam.

BACKGROUND OF THE INVENTION

Vehicle headlamps are important parts of the vehicle lighting system, and provide active safety protection for driving. High power white LED (Light Emitting Diode) is developing into a new generation of green light source of vehicle headlamp due to advantages on small size, high light efficiency, fast response, energy saving and environmental protection, and structural stability, replacing traditional light source with LED light source is an inevitable trend of the development of vehicle headlamp technology.

Influenced by traditional light source of 360 degrees light, the light utilization of the traditional headlamp is low and it is easy to produce glare. In order to improve luminous flux, a light filling unit is often needed to achieve a better road lighting effect, there might be a lower light efficiency, bigger size and serious glare, and so on. However, by using LED, light utilization of the light source can be improved and glare can be reduced, the size can be reduced greatly as well to enhance aesthetics. From the point of the commercialization of headlamp in recent years, dipped beam and high beam are designed separately or multiple optical units filling light for each other are used for most LED headlamps to realize headlamp system design. Therefore, the present design provides an optical design solution for integrated headlamp, of which dipped beam and high beam are integrated into a same optical system to realize a design of LED headlamp with integrated dipped beam and high beam.

Although the design of integrated headlamp gives a solution to integration issue, there are still some deficiencies in the road lighting intellectuality and the adaptability to different road environment. With the development of Intelligent Vehicle Technology, the intelligent of vehicle lighting system will be a trend of future development. Compared with traditional light source, it is easier to realize intelligent control for LED because of its characteristics of fast response and easy control, and so on. Although there's also a headlamp based on AFS (Adaptive Front-lighting System) in traditional light source headlamp system, it implements adaptive lighting mainly by mechanical means, such as adjusting up and down, left and right direction of illumination of the lamp holder mainly by using following-up steering technology or through variable beam pattern produced by different light-cutting devices. There are still some deficiencies, such as the level of intelligent is not so high. For this reason, the present design provides an adaptive beam pattern control system, automatic compensation of light and color temperature control system based on a LED light source module array, to improve the level of intelligent of the headlamp and meet illumination requirements for different road environment. A modular design is realized in the whole system with simpler structure and easy control.

SUMMARY OF THE INVENTION

The technical problem to be solved by the present invention is to provide an adaptive LED multi-module headlamp with integrated dipped beam and high beam, to improve integration and intelligent of lights with simple structure, small size, and low manufacturing cost.

In order to solve above mentioned problem, the technical solution of the present invention is: an adaptive LED multi-module headlamp with integrated dipped beam and high beam comprising: a dipped beam and high beam following-up adaptive beam pattern control system, a light compensation system, and a color temperature control system;

the dipped beam and high beam following-up adaptive beam pattern control system comprising a LED light source module array, the LED light source module array comprising a number of LED light source modules including more than two LED light source modules parallel to each other which forming a direct light source, axes of the more than two LED light source modules paralleling with the center of vehicle body, and including more than one LED light source module arranged outside the direct light source which forming a steering light source, angle between axes of the more than one LED light source module and the center of vehicle body being acute angle, the angle between axes of the LED light module of the steering light source and vehicle body increasing in turn from inside out; the direct light source being more close to the center of vehicle body than the steering light source; the direct light source lighted during normal driving; one or more LED light source modules of the direct light source closed to weaken light intensity of the direct light source while vehicles crossing each other at night; one or more LED light source modules of the steering light source lighted while vehicle turning at night; the LED light source module comprising a first LED light source, a first surface reflector worked with the first LED light source, a second LED light source, a second surface reflector worked with the second LED light source and convex lens, if the first LED light source lighted separately, a dipped beam pattern lighted by the LED light source module, if the first LED light source and the second LED light source lighted simultaneously, a high beam pattern lighted by the LED light source module;

the light compensation system comprising a number of upper polarizing-assisted light filling units above the dipped beam and high beam following-up adaptive beam pattern control system and a number of lower polarizing-assisted light filling units below the dipped beam and high beam following-up adaptive beam pattern control system; the upper polarizing-assisted light filling unit comprising an upper polarizing LED light source and an upper polarizing reflecting surface, the upper polarizing LED light source being at the bottom of the upper polarizing reflecting surface, light emitted from the upper polarizing LED light source reflected by the upper polarizing reflecting surface, so that there being an angle of 6~10° between distribution area of the angle at which light emitted and the ground, to compensate the illumination area during slowing down, driving under heavy load or driving uphill; the lower polarizing-assisted light filling unit comprising an lower polarizing LED light source and an lower polarizing reflecting surface, the lower polarizing LED light source being on the top of the lower polarizing reflecting surface, light emitted from the lower polarizing LED light source reflected by the lower polarizing reflecting surface, so that there being an angle of 6~10° between distribution area of the angle at which light emitted and the ground, to compensate the illumination area during slowing down and driving downhill.

A dipped beam and high beam spot during driving straight and following-up beam pattern while turning could be achieved to get a better illumination angle by arranging multiple independent LED light source modules as a headlamp and by controlling different LED light source modules to be lighted during driving straight or turning in the present invention. The polarization compensation system is used specifically for speeding up or slowing down, driving under heavy load, driving uphill and driving in an urban road.

As an improvement, the first LED light source and second LED light source both comprising a LED chip, a circuit board and a radiator, the circuit board mounted on the radiator, a hole being at the center of the circuit board, a mounting plane formed on the radiator in the position corresponding to the hole of the circuit board, the LED chip fixed on the mounted plane; pads arranged on surface of the circuit board, the LED chip connected with the pads through wire; the hole of the circuit board and the mounting plane forming a groove, the groove filled with fluorescent silica gel.

As an improvement, the method for manufacturing the first LED light source and the second LED light source comprising the following steps:

(1) preprocessing the mounting plane on the top of the radiator;

(2) hollowing the center of the circuit board and fitting it on the radiator, the position of the hole corresponding to the mounting plane preprocessed.

(3) arranging the pads on the surface of the circuit board and applying surface immersion gold to the pads;

(4) placing a number of LED chips onto the mounting plane of the radiator in the position corresponding to the central hole area of the circuit board in a series-parallel way, silver colloid of 25 W/m*k thermal conductivity used as the adhesive to bound the LED chips;

(5) connecting the positive and negative electrodes of the LED chips series-parallel circuit with the pads;

(6) feeding high reflective organic adhesive into the hole along the circuit board, so that the area around from the LED chips to the hole of the circuit fully covered, the quantity of adhesive fed not exceed the surface of the LED chips, and curing the adhesive by heating;

(7) encapsulating the LED chips and the wire by using mixture of the fluorescent powder and silica gel;

(8) heating curing the LED encapsulation adhesive.

The present LED chips are connected with radiator of the vehicle lamp directly to dissipate heat, so that the thermal resistance is reduced and the junction temperature of the LED chips is reduced greatly, the size of the LED could be smaller, thereby the object of the present invention to place multiple LED light source modules could be achieved. Unnecessary light loss would be reduced by using high reflective organic adhesive, then light energy within a directivity range could be improved greatly.

As an improvement, the method for designing the first surface reflector comprising the following steps:

(1) dividing solid angle of the LED light source: letting the LED as coordinate origin, $\alpha$ being the angle between XOZ plane and a plane composed of emitting light and X-axis, $\beta$ being the angle between emitting light and X-axis; applying a uniform discretization on the solid angle of the light source, dividing $\alpha$ into i parts equally, and for each $\alpha$, dividing $\beta$ into j parts equally, then an array of $\alpha(i)$ and $\beta(i,j)$ obtained;

(2) dividing the grid of a receiving plane: according to the distribution requirement, dividing the rectangular coordinates of the receiving plane into i parts in direction x corresponding to the dividing of the solid angle of the light source, and for each of the x parts, dividing direction y into j parts, an array of x(i) and y(i,j) corresponding to the array of $\alpha(i)$ and $\beta(i,j)$ one by one obtained in the rectangular coordinates of the receiving plane;

(3) calculating coordinates of discrete points on a free-form surface: letting Q as luminous flux of a given light source, the LED light source used being a Lambertian source, so its intensity distribution being a cosine distribution of the central intensity and the central intensity of the Lambertian source being $I_0$, energy between incidence light between which and the central axis of the light source there being an angle $\alpha_1$, and incidence light between which and the central axis of the light source there being an angle $\alpha_2$, expressed as the following:

$$Q=2\pi\cdot\int_{\alpha_1}^{\alpha_2} I_0\cdot\sin\alpha\cdot\cos\alpha\cdot d\alpha \qquad (1)$$

luminous flux of each small part of the solid angle being:

$$\text{Energy}=\int_{\alpha(i)}^{\alpha(i+1)}\int_{\beta(i,j)}^{\beta(i,j+1)} I_0\cdot\cos\alpha\cdot\sin^2\beta\cdot d\alpha d\beta \qquad (2)$$

as the value within each small part of the solid angle being known, the central intensity $I_0$ and the energy within each small part of the solid angle calculated based on the formula (1) and the formula (2);

below the horizontal line of the target lighting area, a rectangular area of $y(i,j+1)-y(i,j)$ length and $x(i+1)-x(i)$ width corresponding to each part of angle $\alpha$, and total energy of each rectangular area being:

$$E\text{total}_1=E_c\cdot[x(i+1)-x(i)]\cdot[y(i,j+1)-y(i,j)] \qquad (3)$$

in the formula, $E_c$ representing the illumination, and because the illumination values of areas I, II, III, and IV being variable, pre-setting illumination E, illumination control factor $\gamma$, for each variable area:

$$E_c=E\cdot\gamma(k) \quad k=1,2,3,4 \qquad (4)$$

wherein, the values of $0\le\gamma(k)\le1$, k corresponding to areas I, II, III, and IV one by one, $\gamma(k)$ being variable and to be adjusted constantly in the calculating to meet the requirements of standard;

a triangle region of $y(i,j+1)-y(i,j)$ height and a $x(i+1)-x(i)$ base being above the horizontal line of the target illumination area during dividing, and total energy of this area being:

$$E\text{total}_2=\tfrac{1}{2}\cdot E_c\cdot[x(i+1)-x(i)]\cdot[y(i,j+1)-y(i,j)] \qquad (5)$$

without considering the loss of energy, the energy emitted from the LED light source being equal to the energy received on the receiving plane, and the following obtained based on the law of conservation of energy:

$$\text{Energy}=E\text{total}_1+E\text{total}_2 \qquad (6)$$

supposing that a total internal reflection occurred while light interacting with the reflector, a normal vector to the free-form surface obtained based on the catadioptric law, and the tangent plane obtained using this normal vector, then the coordinates of next point on the curve found by obtaining the intersection of the tangent plane and the incidence light, the vector format of the catadioptric law expressed as the following:

$$\sqrt{1+n^2-2\cdot n\cdot(\overrightarrow{Out}\cdot\overrightarrow{In})}\cdot\vec{N}=\overrightarrow{Out}-n\cdot\overrightarrow{In} \qquad (7)$$

wherein, n being a refractive index which being 1 here, $\overrightarrow{In}$, $\overrightarrow{Out}$ and $\vec{N}$ being the unit vector of incident ray, the unit vector of emitting light, and the unit vector respectively;

during the iterative calculation, a starting point of the calculation determined first, and a boundary curve found based on the starting point, then the whole free-form surface calculated by taking each point on the boundary curve as starting point.

Two independent LED light sources are used in the present independent vehicle headlamp emitter with integrated dipped beam and high beam, working with corresponding reflective surface to form a dipped beam and high beam pattern, so only an iteration of two swept blend reflective surfaces and two light sources is needed to form a dipped beam and high beam pattern of the vehicle headlamp required by the ECE regulation, without additional mechanical structure to adjust a shading board. The accurate heat dissipation structure and novel reflective surface assembly structure are simple, reliable and compact, the light efficiency of LED could be utilized to the maximum extent. The present invention is energy-efficient and applicable to LED matrix light source of various different kinds of vehicle.

As an improvement, the method for designing the second surface reflector comprising the following steps:

(1) dividing the gird of a receiving plane: as required for high beam illumination, the illumination at the center being the highest, and lower gradually towards periphery, dividing the rectangular coordinates of the receiving plane into i parts in corresponding direction x, and for each of the x parts, dividing direction y into j parts, an array of x(i) and y(i,j) corresponding to the array of α(i) and β(i,j) one by one obtained in the rectangular coordinates of the receiving plane;

(2) setting the illumination control factor: because the illumination at the center being higher for high beam, and lower gradually towards periphery, the illumination control factor set for loop of the divided grid, and for different loop:

$$E_c = E\cdot\gamma(k) \quad k=1,2,3,4$$

(3) calculating coordinates of discrete points on a free-form surface: letting Q as luminous flux of a given light source, the LED light source used being a Lambertian source, so its intensity distribution being a cosine distribution of the central intensity and the central intensity of the Lambertian source being $I_0$, energy between incidence light between which and the central axis of the light source there is an angle $\alpha_1$, and incidence light between which and the central axis of the light source there being an angle $\alpha_2$, expressed as the following:

$$Q=2\pi\cdot\int_{\alpha_1}^{\alpha_2} I_0 \cdot\sin\alpha\cdot\cos\alpha\cdot d\alpha \qquad (1)$$

luminous flux of each small part of the solid angle being:

$$\text{Energy}=\int_{\alpha(i)}^{\alpha(i+1)}\int_{\beta(i,j)}^{\beta(i,j+1)} I_0\cdot\cos\alpha\cdot\sin^2\beta\cdot d\alpha d\beta \qquad (2)$$

as the value within each small part of the solid angle being known, the central intensity $I_0$ and the energy within each small part of the solid angle calculated based on the formula (1) and the formula (2);

below the horizontal line of the target lighting area, a rectangular area of y(i,j+1)−y(i,j) length and x(i+i)−x(i) width corresponding to each part of angle α, and total energy of each rectangular area being:

$$E\text{total}_1=E_c\cdot[x(i+1)-x(i)]\cdot[y(i,j+1)-y(i,j)] \qquad (3)$$

in the formula, because the illumination values of area I, II, III, and IV being variable, $E_c$ representing the illumination, and wherein, the values of 0≤γ(k)≤1, k corresponding to areas I, II, III, and IV one by one, γ(k) being variable and to be adjusted constantly in the calculating to meet the requirements of standard;

a triangle region of y(i,j+1)−y(i,j) height and a x(i+1)−x(i) base being above the horizontal line of the target illumination area during dividing, and total energy of this area being:

$$E\text{total}_2=\frac{1}{2}\cdot E_c\cdot[x(i+1)-x(i)]\cdot[y(i,j+1)-y(i,j)] \qquad (5)$$

without considering the loss of energy, the energy emitted from the LED light source being equal to the energy received on the receiving plane, and the following obtained based on the law of conservation of energy:

$$\text{Energy}=E\text{total}_1+E\text{total}_2 \qquad (6)$$

supposing that a total internal reflection occurred while light interacting with the reflector, a normal vector to the free-form surface obtained based on the catadioptric law, and the tangent plane obtained using this normal vector, then the coordinates of next point on the curve found by obtaining the intersection of the tangent plane and the incidence light, the vector format of the catadioptric law expressed as the following:

$$\sqrt{1+n^2-2\cdot n\cdot(\overrightarrow{Out}\cdot\overrightarrow{In})}\cdot\vec{N}=\overrightarrow{Out}-n\cdot\overrightarrow{In} \qquad (7)$$

wherein, n being a refractive index which being 1 here, $\overrightarrow{In}$, $\overrightarrow{Out}$ and $\vec{N}$ being the unit vector of incident ray, the unit vector of emitting light, and the unit vector respectively;

during the iterative calculation, a starting point of the calculation determined first, and a boundary curve found based on the starting point, then the whole free-form surface calculated by taking each point on the boundary curve as starting point.

As an improvement, the method for establishing a model of the free-form surface obtained: iteratively calculating discrete coordinate points of the free-form surface reflector through the previous method, saving the discrete coordinate points as a text file and inputting it into a 3D graphics software SolidWorks, and fitting it into a smooth surface to obtain an entity model of the reflector, importing the entity model into an optical simulation software Lucidshape, with the properties of the material properties of lens, the light source and the receiving surface set, performing ray tracing for the model.

As an improvement, the LED light source module array consisting of seven LED light source module groups, three of which being a direct light source, four of which being a steering light source.

As an improvement, angles between the four LED light source groups of the steering light source and the center of vehicle body being 13~17°, 17~21°, 28~32° and 40~44° in turn from inside out.

As an improvement, the color temperature control system comprising a number of front fog lamp LED light sources, the front fog lamp LED light source comprising a LED of 2700K color temperature, a LED of 7000K color temperature and a fog lamp reflector.

As an improvement, the headlamp further comprising a closed loop adaptive following-up control system including a vehicle body sensor group, a vehicle body master control MCU and headlamp AFS subsystem AU, the vehicle body sensor group connected with the vehicle body master control MCU, the vehicle body master control MCU controlling the dipped beam and high beam following-up adaptive beam pattern control system, the light compensation system and the color temperature control system through the headlamp AFS subsystem AU; the vehicle body sensor group consisting of a vehicle body speed sensor, a vehicle body dip angle or rotation angle sensor, a vehicle body heavy load sensor, a vehicle body road vibration sensor, a steering wheel steering angle sensor, a rainfall sensor, a haze or snow sensor and a downtown environmental sensor.

The advantageous effects of the present invention as compared with the prior art are as following:

A dipped beam and high beam spot during driving straight and following-up beam pattern while turning can be achieved to get a better illumination angle by arranging multiple independent LED light source modules as a headlamp and by controlling different LED light source modules to be lighted during driving straight or turning in the present invention. The polarization compensation system is used specifically for speeding up or slowing down, driving under heavy load, driving uphill and driving in an urban road. Two independent LED light sources are used in the emitter of the independent vehicle headlamp with dipped beam and high beam in present invention, which are worked with corresponding reflective surface to form a dipped beam and high beam pattern. Only an iteration of two swept blend reflecting surfaces and two light sources is needed to form a dipped beam and high beam pattern of the vehicle headlamp required by the ECE regulation, without additional mechanical structure to adjust a shading board. The accurate heat dissipation structure and novel reflecting surface assembly structure are simple, reliable and compact, the light efficiency of LED can be utilized to the maximum extent. The present invention is energy-efficient and applicable to LED matrix light source of various different kinds of vehicle.

PREFERRED EMBODIMENTS OF THE PRESENT INVENTION

Further illustration on the present invention will be given in the following in conjunction with drawings.

An adaptive LED multi-module headlamp with integrated dipped beam and high beam comprises a dipped beam and high beam following-up adaptive beam pattern control system, a light compensation system and a color temperature control system.

Figure 1:
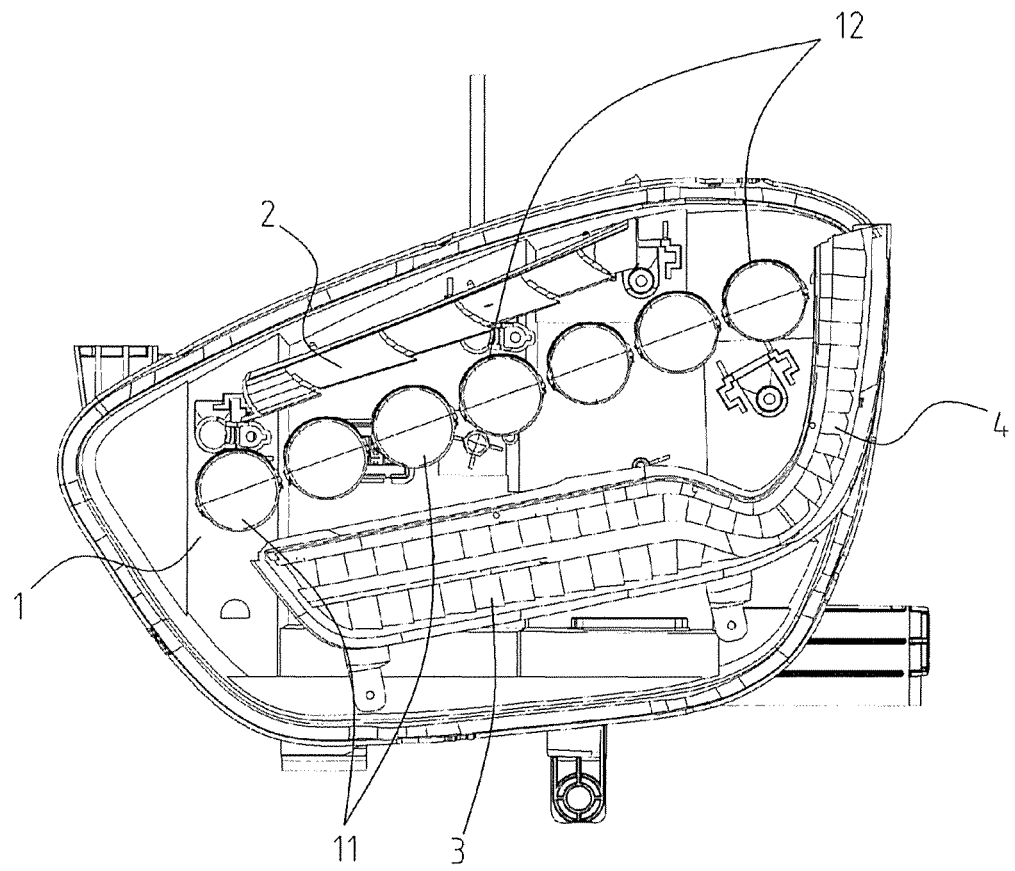
FIG. 1 is a schematic diagram of a headlamp.

As shown in FIG. 1, the said dipped beam and high beam following-up adaptive beam pattern control system comprises a LED light source module array 1. The LED light source module array 1 comprises seven LED light source modules. Three of the LED light source modules close to vehicle body are arranged parallel to each other form a direct light source 11 with the center of the vehicle, where axes of the three LED light source modules are parallel with the center of the vehicle body. The remaining four LED light source modules arranged outside the direct light source 11 form a steering light source 12, the angles between axes of the LED light source modules of the steering light source 12 and the center of vehicle body increase in turn from inside out, the angles between axes of the four LED light source modules of the steering light source 12 and the center of vehicle body are 13~17°, 17~21°, 28~32° and 40~44° in turn from inside out. In the vehicle headlamp of the present invention, a LED light source array consists of seven creative integrated dipped beam and high beam type modules described previously in the present application. Each independent dipped beam and high beam module of the light source array could be controlled and driven separately (all the emitters could be lighted simultaneously or several emitters could be lighted, so as to meet the requirements for light intensity and width of a visual area under different vehicle conditions through light superposition).

Figure 9:
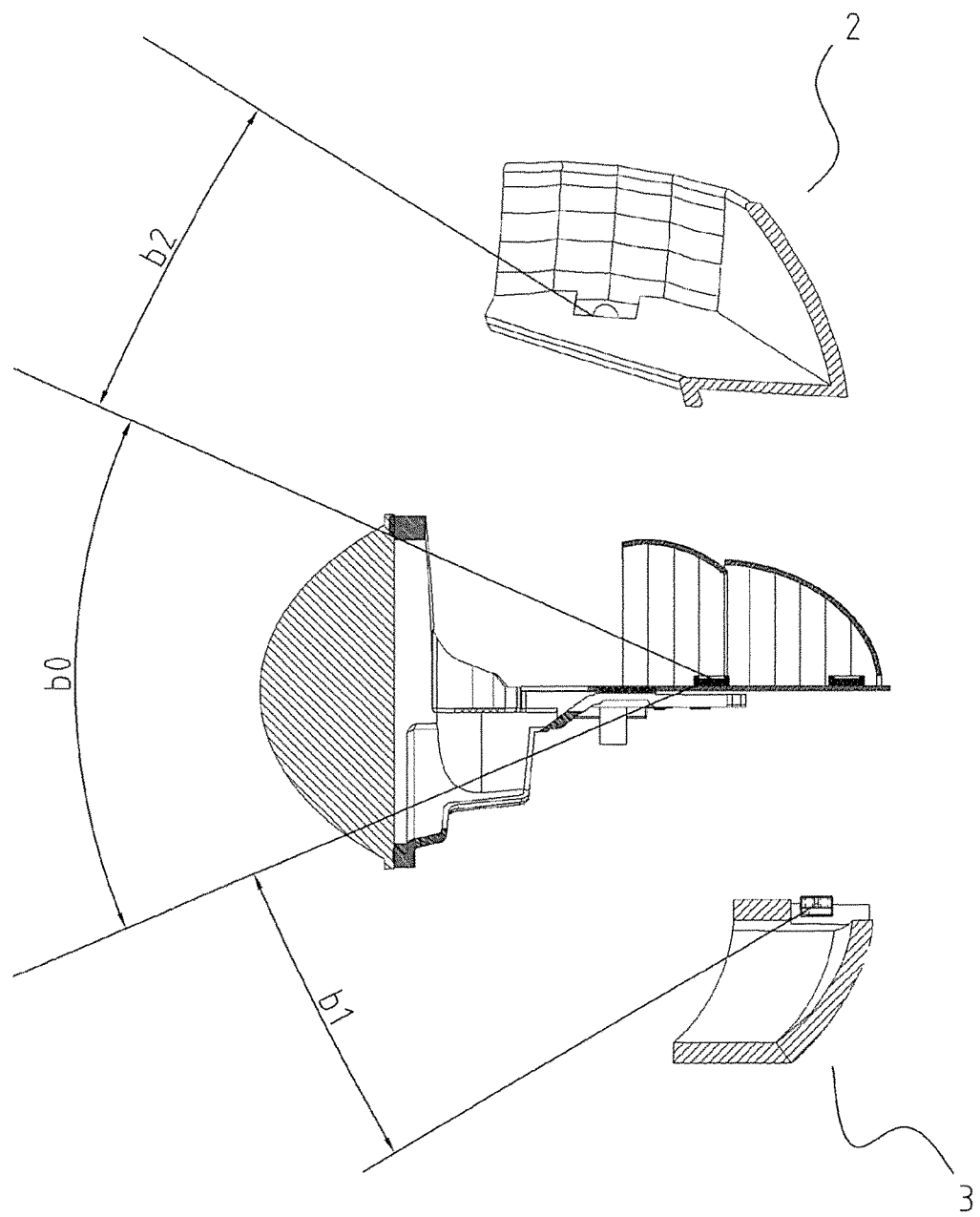
FIG. 9 is a diagram of upper and lower polarizing light fitting units worked with a LED light source module.

As shown in FIG. 1 and FIG. 9, the said compensation system comprises a number of upper polarizing-assisted light filling units 2 above the dipped beam and high beam following-up adaptive beam pattern control system and a number of lower polarizing-assisted light filling units 3 below the dipped beam and high beam following-up adaptive beam pattern control system. The said upper polarizing-assisted light filling unit 2 comprises an upper polarizing LED light source and an upper polarizing reflecting surface. The upper polarizing LED light source is at the bottom of the upper polarizing reflecting surface, and light emitted from the upper polarizing LED light source may be reflected by the upper polarizing reflecting surface, which causes the angle between the angle distribution area of emitted light and the ground automatically to be 6~10°, to compensate the illumination area automatically during slowing down, driving under heavy load, or driving uphill. The said lower polarizing-assisted light filling unit 3 comprises a lower polarizing LED light source and a lower polarizing reflecting surface. The lower polarizing LED light source is on the top of the lower polarizing reflecting surface. Light emitted from the lower LED light source may be reflected by the lower polarizing reflecting surface, which causes the angle between the distribution area of the angle at which light emitted and the ground to be 6~10°, to compensate the illumination area automatically during slowing down and driving downhill.

As shown in FIG. 1, the color temperature control system comprises a number front fog lamp LED light source 4 including a LED of 2700K color temperature, a LED of 7000K color temperature and a fog lamp reflector. When a vehicle is driving on different latitude and longitude on the earth in different degrees of haze and rain and snow weather, a value from a vehicle body light intensity and color temperature sensor, a haze and dust sensor, and a rain and snow sensor may be input into the MCU, then an instruction may be output to an intelligent lighting driving system of the LED light source of the fog lamp by a comprehensive algorithm of MCU, the two yellow LED light sources of different color temperature may be adjusted through the output of the PWM dimming algorithm of the intelligent light source driving module of the fog lamp, so as to output by mixing light optimal color temperature and brightness of a warning fog lamp for the driving condition, thereby improving the safety and warning function of the vehicle when driving in complex environment, giving a clearer indication of driving location to neighbor vehicles.

Figure 2:
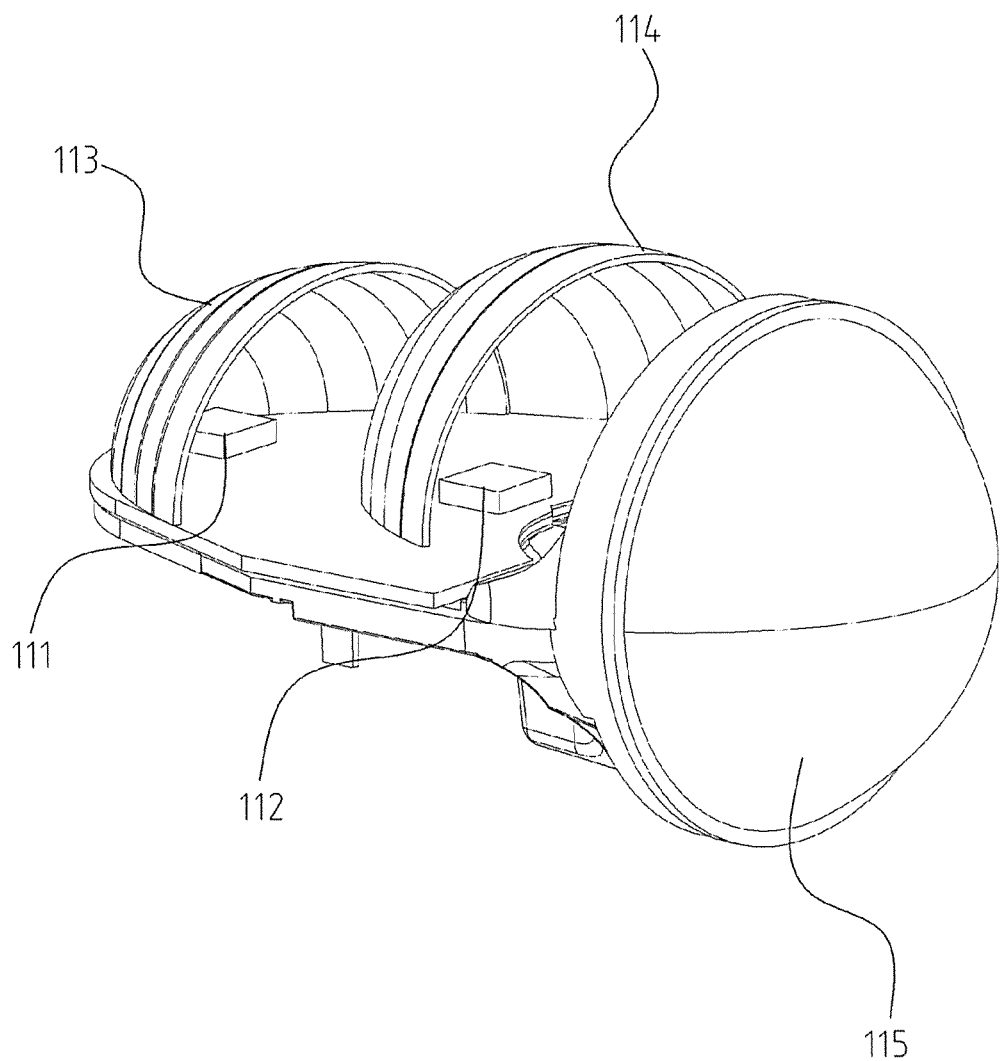
FIG. 2 is a perspective view of a LED light source module.
Figure 3:
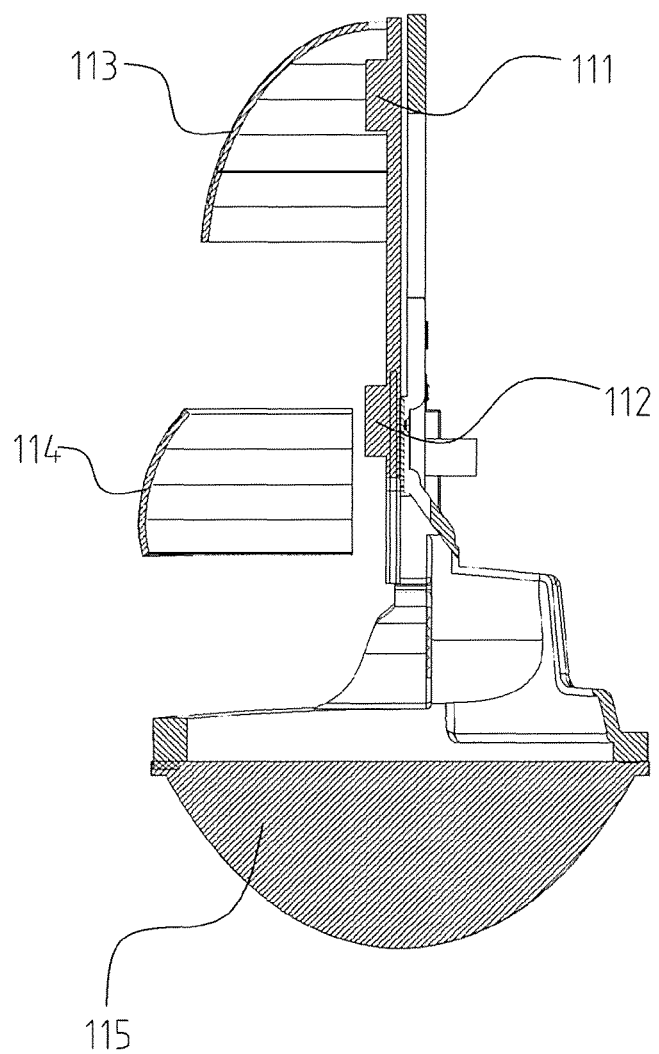
FIG. 3 is a section view of a LED light source module.

As shown in FIG. 2 and FIG. 3, the said LED light source module comprises a first LED light source 112, a first surface reflector 114 worked with the first LED light source 112, a second LED light source 111, a second surface reflector 113 worked with the second LED light source 111 and convex lens 115. The first surface reflector 114 is in front of the second surface reflector 113, if the first LED light source 112 is lighted separately, a dipped beam pattern may be lighted by the LED light source module; if the first light source 112 and the second LED light source Ill are lighted simultaneously, a high beam pattern may be lighted by the LED light source module.

The said first LED light source 112 and the second LED light source Ill both comprise a LED chip, a circuit board and a radiator on which the circuit board is mounted, there's a hole in the center of the circuit board corresponding where a mounting plane formed on the radiator, the LED chip is fixed on the mounting plane. Pads to which the LED chip is connected by wire are arranged on the surface of the circuit board. The hole of the circuit board and the mounting plane form a groove filled with fluorescent silica gel.

A method for manufacturing the first LED light source 112 and the second LED light source 111 comprises the following steps:

(1) preprocessing the mounting plane on the top of the radiator;

(2) hollowing the center of the circuit board and fitting it on the radiator, the hole corresponds to the mounting plane preprocessed;

(3) arranging the pads on the surface of the circuit board and applying surface immersion gold to the pads;

(4) placing a number of LED chips onto the mounting plane of the radiator in the position corresponding to the central hole area of the circuit board in a series-parallel way, silver colloid of 25 W/m*k thermal conductivity could be used as the adhesive to bound the LED chips;

(5) connecting the positive and negative electrodes of the LED chips series-parallel circuit with the pads;

(6) feeding high reflective organic adhesive into the hole along the circuit board, so that the area around from the LED chips to the hole of the circuit are fully covered, the quantity of adhesive fed shouldn't exceed the surface of the LED chips, and curing the adhesive by heating;

(7) encapsulating the surface of the LED chips by using mixture of the fluorescent powder and silica gel; and (8) heating curing the LED encapsulation adhesive.

The present LED chips are connected with radiator of the vehicle lamp directly to dissipate heat, so that the thermal resistance is reduced and the junction temperature of the LED chips is reduced greatly, the size of the LED could be smaller, thereby the object of the present invention to place multiple LED light source modules could be achieved. Unnecessary light loss would be reduced by using high reflective organic adhesive, then light energy within a directivity range could be improved greatly.

Two independent LED light sources are used in the present independent vehicle headlamp emitter with integrated dipped beam and high beam, working with corresponding reflective surface to form a dipped beam and high beam pattern, so only an iteration of two swept blend reflective surfaces and two light sources is needed to form a dipped beam and high beam pattern of the vehicle headlamp required by the ECE regulation, without additional mechanical structure to adjust a shading board. The accurate heat dissipation structure and novel reflective surface assembly structure are simple, reliable and compact, the light efficiency of LED could be utilized to the maximum extent. The present invention is energy-efficient and applicable to LED matrix light source of various different kinds of vehicle.

Figure 11:
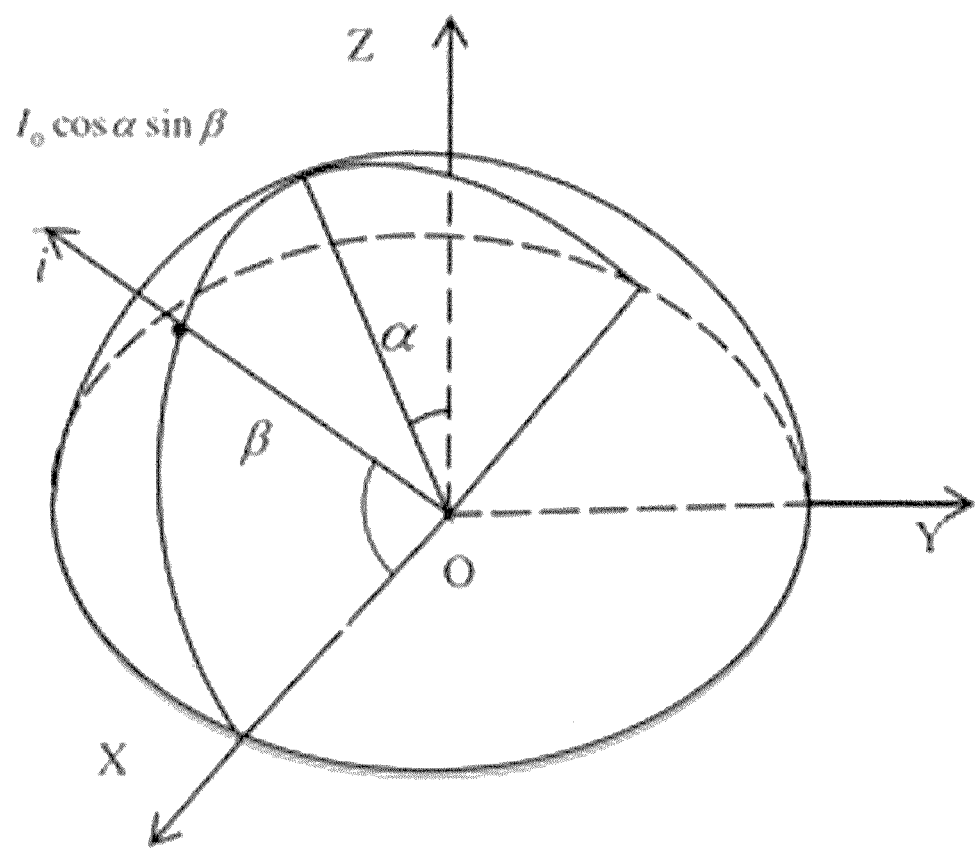
FIG. 11 is a LED spatial coordinate map.
Figure 12:
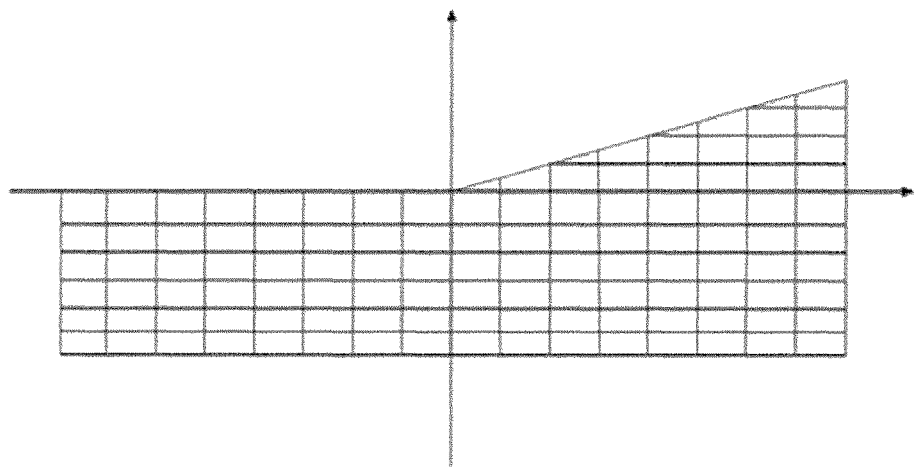
FIG. 12 is a grid dividing of a dipped beam receiving plane.

A method for designing the first surface reflector 114 comprises the following steps:

(1) Dividing solid angle of the LED light source: let the LED as coordinate origin, as shown in FIG. 11, $\alpha$ is the angle between XOZ plane and a plane composed of emitting light i and X-axis, $\beta$ is the angle between emitting light and X-axis; applying a uniform discretization on the solid angle of the light source, dividing $\alpha$ into i parts equally, and for each $\alpha$, dividing $\beta$ into j parts equally, then an array of $\alpha(i)$ and $\beta(i,j)$ could be obtained;

(2) Dividing the grid of a receiving plane: as shown in FIG. 12, according to the distribution requirement, dividing the rectangular coordinates of the receiving plane into i parts in direction x corresponding to the dividing of the solid angle of the light source, and for each of the x parts, dividing direction y into j parts, an array of x(i) and y(i,j) corresponding to the array of $\alpha(i)$ and $\beta(i,j)$ one by one could be obtained in the rectangular coordinates of the receiving plane;

(3) Calculating coordinates of discrete points on a freeform surface: let Q as luminous flux of a given light source, the LED light source used is a Lambertian source, so its intensity distribution is a cosine distribution of the central intensity and the central intensity of the Lambertian source is $I_0$, energy between incidence light between which and the central axis of the light source there is an angle $\alpha_1$, and incidence light between which and the central axis of the light source there is an angle $\alpha_2$, could be expressed as the following:

$$Q = 2\pi \cdot \int_{\alpha_1}^{\alpha_2} I_0 \cdot \sin\alpha \cdot \cos\alpha \, d\alpha \qquad (1)$$

Luminous flux of each small part of the solid angle is:

$$\text{Energy} = \int_{\alpha(i)}^{\alpha(i+1)} \int_{\beta(i,j)}^{\beta(i,j+1)} I_0 \cdot \cos\alpha \cdot \sin^2\beta \cdot d\alpha \, d\beta \qquad (2)$$

As the value within each small part of the solid angle is known, the central intensity $I_0$ and the energy within each small part of the solid angle could be calculated based on the formula (1) and the formula (2);

Below the horizontal line of the target lighting area, a rectangular area of $y(i,j+1)-y(i,j)$ length and $x(i+1)-x(i)$ width corresponds to each part of angle $\alpha$, and total energy of each rectangular area is:

$$E\text{total}_1 = E_c \cdot [x(i+1)-x(i)] \cdot [y(i,j+1)-y(i,j)] \qquad (3)$$

In the formula, $E_c$ represents the illumination, and because the illumination values of area I, II, III, and IV are variable, pre-setting illumination E, illumination control factory, for each variable area:

$$E_c = E \cdot \gamma(k) \quad k=1,2,3,4 \qquad (4)$$

wherein, the values of $0 \leq \gamma(k) \leq 1$, k corresponds to areas I, II, III, and IV one by one, and $\gamma(k)$ are variable and have to be adjusted constantly in the calculating to meet the requirements of standard;

Above the horizontal line of the target illumination area, there's a triangle region of $y(i,j+1)-y(i,j)$ height and a $x(i+1)-x(i)$ base during dividing, and total energy of this area is:

$$E\text{total}_2 = \frac{1}{2} \cdot E_c \cdot [x(i+1)-x(i)] \cdot [y(i,j+1)-y(i,j)] \quad (5)$$

Without considering the loss of energy, the energy emitted from the LED light source is equal to the energy received on the receiving plane, and the following could be obtained based on the law of conservation of energy:

$$\text{Energy} = E\text{total}_1 + E\text{total}_2 \quad (6)$$

Supposing that there may be a total internal reflection while light is interacting with the reflector, a normal vector to the free-form surface could be obtained based on the catadioptric law, and the tangent plane could be obtained using this normal vector, then the coordinates of next point on the curve could be found by obtaining the intersection of the tangent plane and the incidence light. The vector format of the catadioptric law could be expressed as the following:

$$\sqrt{1+n^2-2 \cdot n \cdot (\overrightarrow{\text{Out}} \cdot \overrightarrow{\text{In}})} \cdot \overrightarrow{N} = \overrightarrow{\text{Out}} - n \cdot \overrightarrow{\text{In}} \quad (7)$$

Wherein, n is a refractive index which is 1 here, $\overrightarrow{\text{In}}$, $\overrightarrow{\text{Out}}$ and $\overrightarrow{N}$ is the unit vector of incident ray, the unit vector of emitting light, and the unit vector respectively;

During the iterative calculation, a starting point of the calculation should be determined first, and a boundary curve could be found based on this starting point, then the whole free-form surface could be calculated by taking each point on the boundary curve as starting point.

Figure 13:
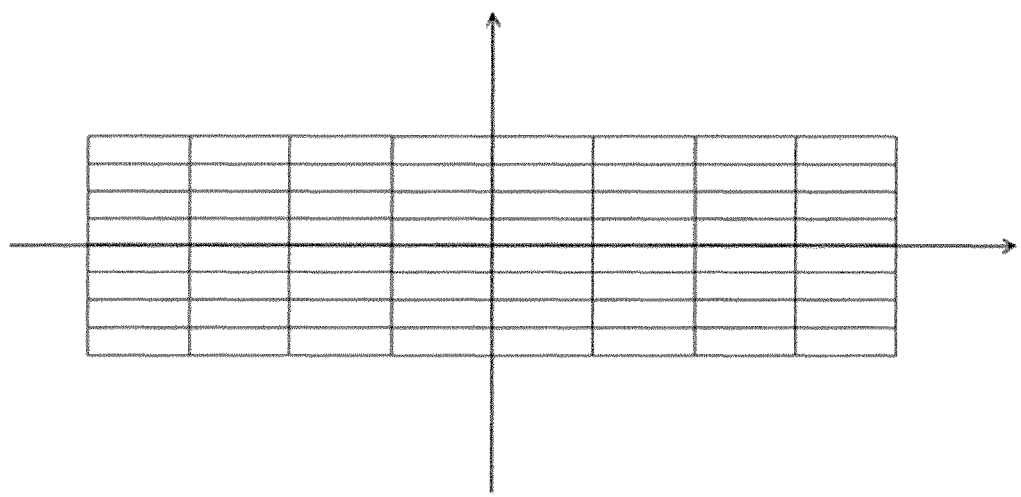
FIG. 13 is a grid dividing of a high beam receiving plane.

A method for designing the second surface reflector 113 comprises the following steps:

The designing of the high beam related part is the same as of the dipped beam related part in general. But due to different illumination requirements, the grid dividing of its receiving plane and illumination control factor could be designed as following 1. Dividing the Gird of a Receiving Plane As required for high beam illumination, the illumination at the center should be the highest, and lower gradually towards periphery. Dividing the rectangular coordinates of the receiving plane into i parts in corresponding direction x in a way as shown in FIG. 13, and for each of the x parts, direction y is divided into j parts, an array of x(i) and y(i,j) corresponding to the array of α(i) and β(i,j) one by one could be obtained in the rectangular coordinates of the receiving plane;

2. Setting the Illumination Control Factor.

Because the illumination at the center should be higher for high beam, and lower gradually towards periphery, the illumination control factor should be set for loop of the divided grid, and for different loop:

$$E_c = E \cdot \gamma(k) \, k=1,2,3,4$$

Coordinates of each point on the high beam free-form surface could be obtained according to the solving method and the calculating steps of discrete points on the dipped beam free-form surface. Performing a model and simulation for the calculated reflector surface and analyzing the simulation results, then the ideal model could be obtained finally. The parameter setting of the illumination control factor could be modified for optimization and modification.

The model establishing and simulation analysis of the free-form surface

Discrete coordinate points of the free-form surface reflector could be obtained through iterative calculation according to the previous method for designing, then the discrete coordinate points could be saved as a text file then input into a 3D graphics software SolidWorks, and fitted into a smooth surface to obtain an entity model of the reflector. The entity model is imported into an optical simulation software Lucidshape, with the properties of the material properties of lens, the light source and the receiving surface set, then performing ray tracing for the model. OSRAM U1A5 LED chips are used in the simulation as a light source, the reflector is set as a completely reflecting surface, lens with refractive index of about 1.586 is made of PC. It can be seen from the illumination distribution map of dipped beam and high beam that emitting light of the LED through the reflector and lens is distributed within a predetermined range of light distribution, which meets the requirements of relevant regulations. The light utilization efficiency of the LED optical system is that the utilization efficiency of dipped beam is above 70%, and above 85% for high beam, ideally, the light utilization efficiency is defined as a ratio of the amount of lights received on a target surface to the total amount of lights emitted from a LED light source.

Figure 10:
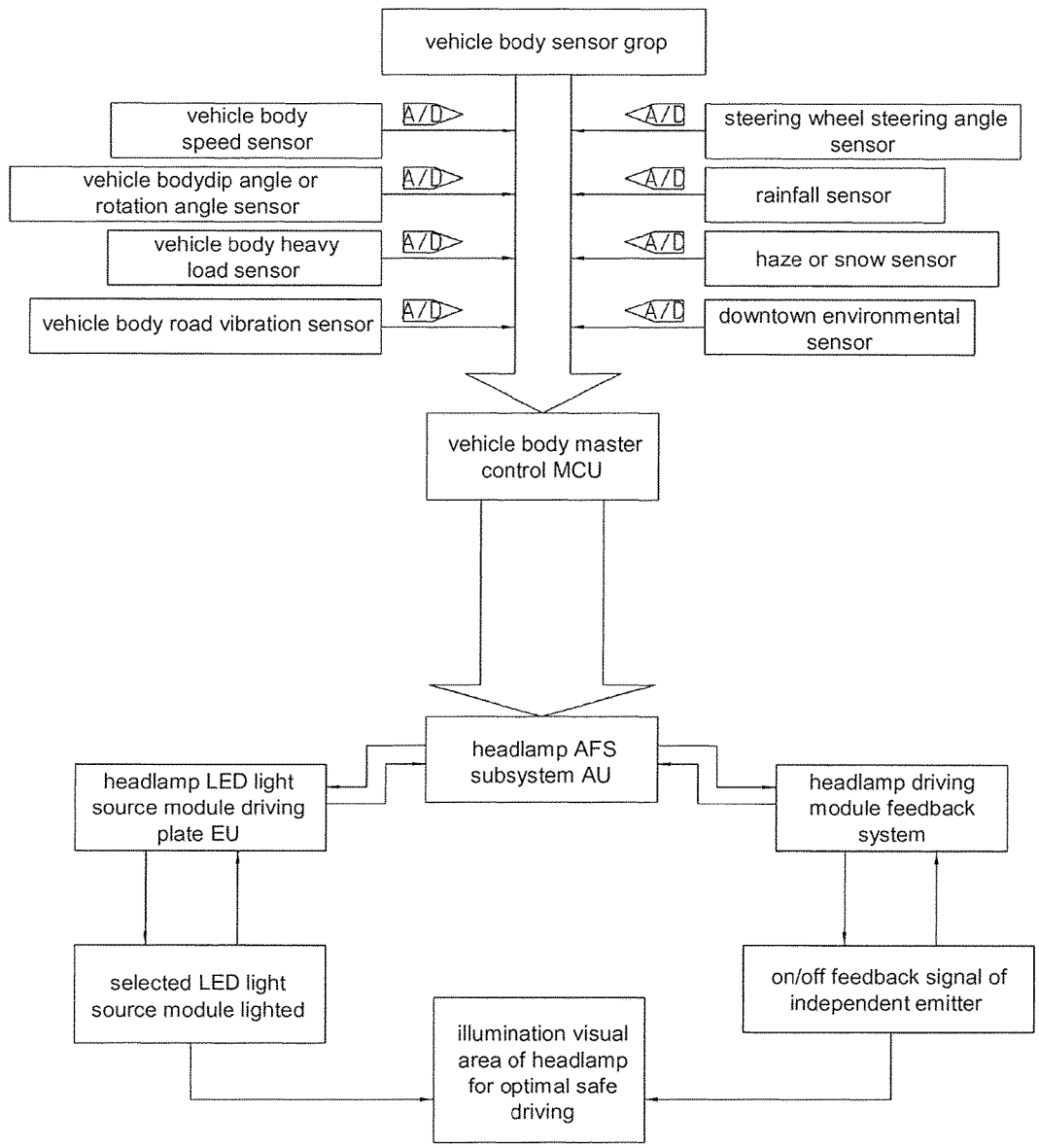
FIG. 10 is a schematic diagram of a closed loop adaptive following-up control system.

As shown in FIG. 10, the dipped beam and high beam following-up adaptive beam pattern control system, the light compensation system and the color temperature control system in the headlamp are all controlled and coordinated by a closed loop adaptive following-up control system, including a vehicle body sensor group, a vehicle body master control MCU and a headlamp AFS subsystem AU. The vehicle body sensor group is connected to the master control MCU which controls the dipped beam and high beam following-up adaptive beam pattern control system, the light compensation system and the color temperature control system through the headlamp AFS subsystem AU. The vehicle body sensor group consists of a vehicle body speed sensor, a vehicle body angle sensor, a vehicle body dip angle or rotation angle sensor, a vehicle body heavy load sensor, a vehicle body road vibration sensor, a steering wheel steering angle sensor, a rainfall sensor, a haze or snow sensor and a downtown environmental sensor. A separate module in the LED light source module array of the left and right two headlamps could be lighted through a vehicle body MCU instruction and corresponding driving control system by the adaptive following-up system, so that road illumination of comfortable brightness that best consistent with safe driving under different driving conditions could be achieved by the LED headlamp in the present invention, which improves the driving safety and comfort for drivers greatly. Optimizing and combining different LED light source module array 1 groups, the following safe driving functions could be fulfilled and optimized:

1. Normal Driving

Figure 4:
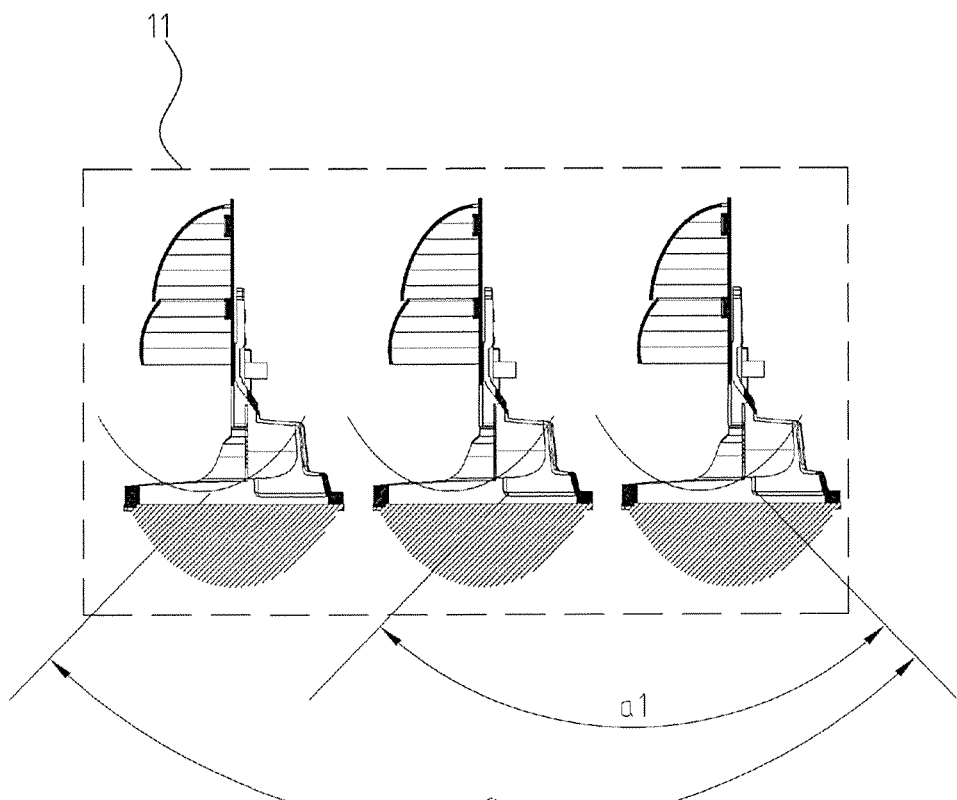
FIG. 4 is a diagram of a LED light source module array lighted during normal driving.

As shown in FIG. 4, only three independent LED light source modules close to the center of vehicle body among respective light source array of the left and the right headlamp are needed to be lighted respectively during normal driving, to meet the regulatory requirements for the brightness of dipped beam and high beam of the headlamp, the requirements of "GB 25991-2010 LED Headlamp for Automobile" and the requirements of "GB 4599-2007 Filament, Bulb and Headlamp for Automobile."

Being mounted parallel to each other, light intensity and illumination area of the central three independent LEDs with integrated dipped beam and high beam modules are enhanced from each other, so as to meet the requirements of laws and regulations.

2. Crossing at Night

When two vehicles crossing each other at night, light intensity data of the light emitted from the automobile in opposite direction from a vehicle body light intensity sensor could be input into the vehicle body master control MCU, of which a control instruction is used for driving lamp control unit module EU to close one of more separate LED light source of direct light sources 11 modules mounted parallel of the left headlamp, so as to reduce total luminous intensity of the left matrix light source, while keeping brightness of the right matrix light source, thereby preventing intense light of the high beam affecting safe driving of the opposite driver. It may be known through the experimental contrast that: the vehicle running in opposite direction would be totally under the intense light, and safe driving for the opposite driver at night would be affected seriously, unless a LED light source matrix which could be controlled separately being used. However, each LED light source module could be controlled optimally in the present invention, one or more independent LED light source modules of the left headlamp of the vehicle could be closed automatically according to road condition of the vehicle in opposite direction at night under a comprehensive regulation of the vehicle body sensor and electronic control system, the width of emitting light from the left headlamp of the vehicle could be narrow down $a2<a1$, so as to ensure safe driving for the opposite vehicle. After the crossing, the multi-point LED light source array of the left headlamp would return to normal light intensity and width range a2.

3. Turning at Night

Based on the requirements of the technical standard of the highway engineering:

| JTG B01-2014 technical standard of the highway engineering | | | | | | | |
|---|---|---|---|---|---|---|---|
| design speed (km/h) | 120 | 100 | 80 | 60 | 40 | 30 | 20 |
| minimum radius of circular curve (meter) | 570 | 360 | 220 | 115 | 60 | 30 | 15 |
| stopping sight distance (meter) | 210 | 160 | 110 | 75 | 40 | 30 | 20 |
| maximum longitudinal gradient (%) | 3 | 4 | 5 | 5 | 7 | 8 | 9 |

3.1 Light Filling within Visual Area Under Road Condition of Big Turning Radius at a Speed of 80~120 km/h.

Figure 5:
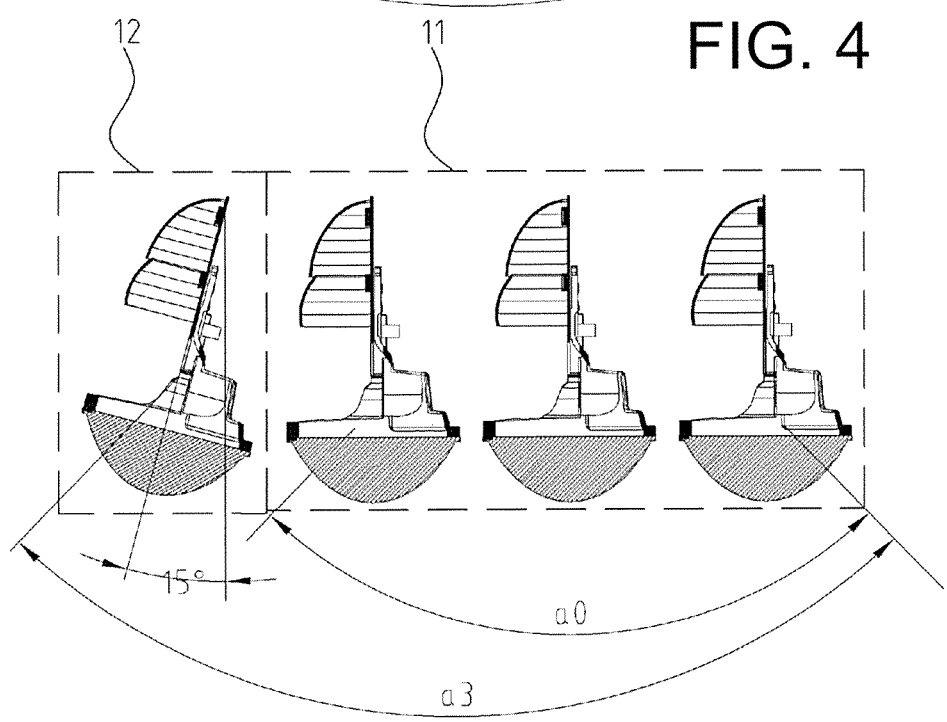
FIG. 5 is a diagram of a LED light source module array lighted while turning at speed of 80~120 km/h.

According to the requirements of the JTG B01-2014, a vehicle should have a steering angle of 11° at a speed of 120 km/h within a safe and reliable stopping sight distance, while the minimum turning radius is 570 meters and the minimum stopping sight distance is 210 meters. A vehicle should have a steering angle of 13° at a speed of 100 km/h within a safe and reliable stopping sight distance, while the minimum turning radius is 360 meters and the minimum stopping sight distance is 160 meters. And a vehicle should have a steering angle of 14° at a speed of 80 km/h within a safe and reliable stopping sight distance, while the minimum turning radius is 220 meters and the minimum stopping sight distance is 110 meters. The data from a vehicle sensor, a steering wheel steering sensor, a vehicle body yaw sensor and a vehicle body speed sensor could be transmitted to the vehicle body master control MCU, as shown in FIG. 5, illuminated area on both left and right sides of the vehicle body could be increased by 15% respectively through adding the first LED light source module of the lighted steering light source 12 by the driving control system of the LED light source module of the headlamp.

3.2 Light Filling within Visual Area Under Road Condition of Small Turning Radius at a Speed of 40~60 km/h.

Figure 6:
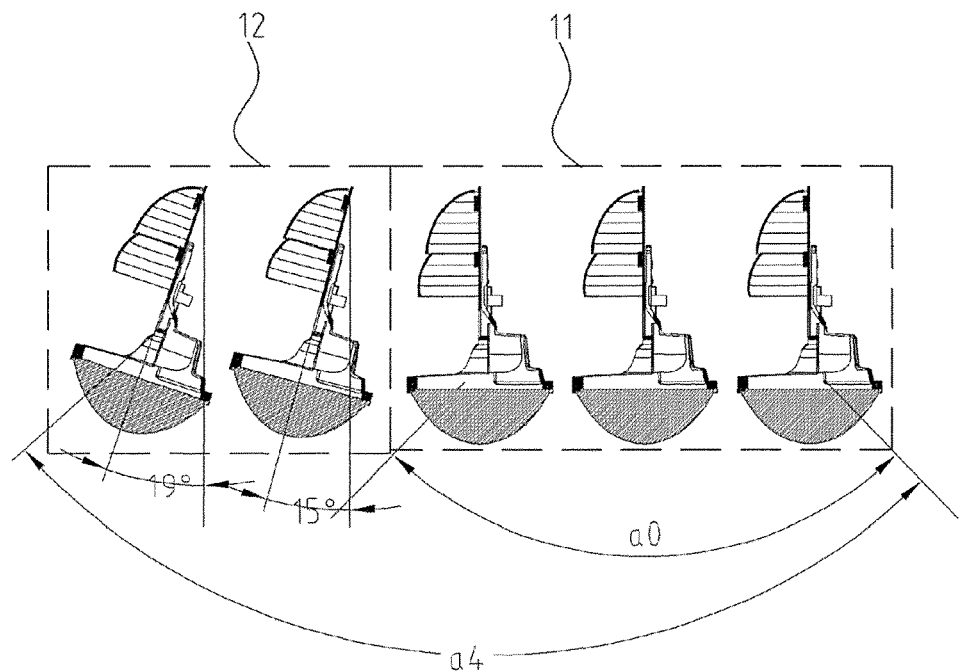
FIG. 6 is a diagram of a LED light source module array lighted while turning at speed of 40~60 km/h.

According to the requirements of the JTG B01-2014, a vehicle should have a steering angle of 19° at a speed of 60 km/h within a safe and reliable stopping sight distance, while the minimum turning radius is 115 meters and the minimum stopping sight distance is 75 meters. A vehicle should have a steering angle of 19° at a speed of 40 km/h within a safe and reliable stopping sight distance, while the minimum turning radius is 60 meters and the minimum stopping sight distance is 40 meters. As shown in FIG. 6, visual area could be increased by 190 during steering through adding the first and second LED light source module of the lighted steering light source 12 by the driving control system of the LED light source module of the headlamp, so that illuminated area on both left and right sides of the vehicle body could be increased by 19° respectively when the driver is making a small turning radius turn at speed from 60 to 40 km/h.

Figure 7:
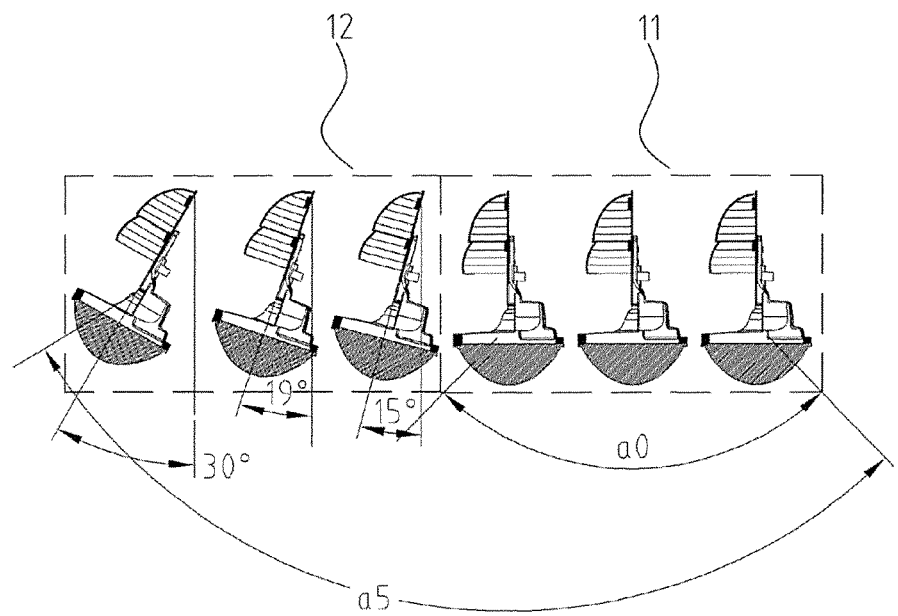
FIG. 7 is a diagram of a LED light source module array lighted while turning at speed of 30 km/h.

3.3 Light Filling within Visual Area Under Road Condition of Small Turning Radius of 30 Meters at a Speed of 30 km/h According to the requirements of the JTG B01-2014, a vehicle should have a steering angle of 30° at a speed of 30 km/h within a safe and reliable stopping sight distance, while the minimum turning radius is 30 meters and the minimum stopping sight distance is 30 meters. As shown in FIG. 7, visual area could be increased by 30° during steering through adding the first to the third LED light source module of the lighted steering light source 12 by the driving control system of the LED light source module of the headlamp, so that illuminated area on both left and right sides of the vehicle body could be increased by 30° respectively when the driver is making a small turning radius turn at speed of 30 km/h.

Figure 8:
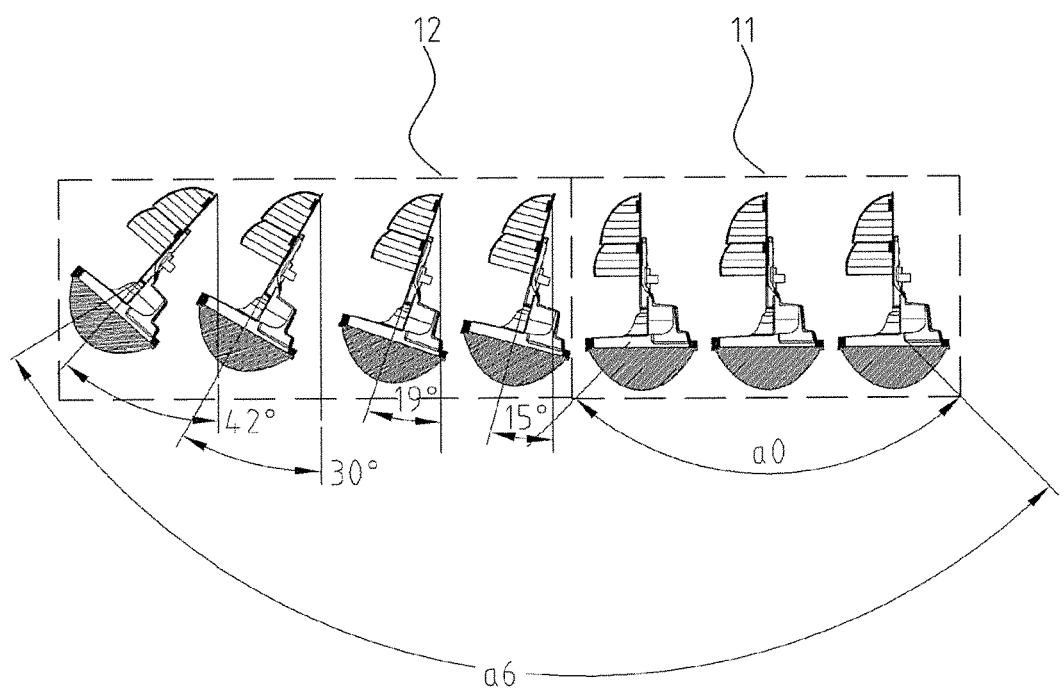
FIG. 8 is a diagram of a LED light source module array lighted while turning at speed of 20 km/h.

3.4 Light Filling within Visual Area Under Road Condition of Small Turning Radius of 15 Meters at a Speed of 30 km/h According to the requirements of the JTG B01-2014, a vehicle should have a steering angle of 42° at a speed of 20 km/h within a safe and reliable stopping sight distance, while the minimum turning radius is 30 meters and the minimum stopping sight distance is 15 meters. As shown in FIG. 8, visual area could be increased by 42° during steering through adding all the LED light source module of the lighted steering light source 12 by the driving control system of the LED light source module of the headlamp, so that illuminated area on both left and right sides of the vehicle body can be increased by 42° respectively when the driver is making a small turning radius turn at speed of 20 km/h.

On a left curve, comprehensive data from the vehicle body speed sensor, the steering wheel steering angle sensor and the vehicle body yaw speed rotation angle sensor could be obtained by the adaptive following-up control system of the vehicle body master control MCU, and turning radius needed for the vehicle and the needed width of the illumination area on the side of the vehicle could be calculated based on these data, then corresponding instruction could be output to the driving module of the LED lamp, and as a result four additional independent LED light source modules of the steering light source 12 could be opened in turn according to the best adaptability to broaden the visual area on the left and light intensity on a left curve.

4. Adaptation in Rain and Snow or Haze Weather

In rain and snow or haze weather, signal from the light intensity sensor of the vehicle could be transmitted to the vehicle body master control MCU by a controller, and the driving circuit of the LED light source module array 1 could be controlled to output current by a control program of the vehicle body master MCU, thereby increasing the brightness and illumination of a headlamp through increasing driving power of each LED light source module, so as to improve visibility and visual area when driving in bad rain and snow and haze weather.

5. Adaptive System for Speeding Up or Slowing Down, Driving Under Heavy Load, Driving Uphill and Driving in Unban Roads Value from respective sensor of the adaptive system for speeding up, slowing down, driving under heavy load, driving uphill and driving in unban roads could be processed based on a comprehensive comparison algorithm in the MCU control system, and driving signal could be output to respective executing unit finally. Lateral beam pattern width of the whole headlamp could be improved by the intelligent lighting driving system of the dipped beam and high beam LED light source and multiple independent dipped beam and high beam light sources of the whole lamp and upper and lower two groups of polarizing-assisted fill light sources, and upward or downward illumination distance and height could be improved as well, so as to meet the requirement on comfort of illumination for the optimal safe driving. While speeding up or slowing down, data from the vehicle body speed sensor would be transmitted to the vehicle body master control MCU which would select the upper or lower polarizing-assisted light source module of the headlamp to be lighted to increase the illumination area of the headlamp upward or downward, so as to improve the optimal match of the visual area during driving. Based on the optical mirror reflection principle, light emitted from a LED light source would be reflected by a mirror of the reflector, so that there may be an angle of 6~10° between the distribution area of the angle at which light emitted and the ground to compensate the illumination area during slowing down, driving under heavy load or driving uphill. Based on the optical mirror reflection principle, light emitted from a LED light source would be reflected by a mirror of the reflector, so that there may be an angle of 6~10° between the distribution area of the angle at which light emitted and the ground to compensate the illumination area during driving downhill slowing down.

6. Adaptive Following-up Headlamp Lighting During Driving in Unban Roads, Country Roads and Highways While driving in different road environments, 14 independent LED light source modules and upper and lower polarizing light filling units of the left and right two headlamps could be optimized and combined respectively by the comprehensive control module of the vehicle body master control MCU according to comparative data of the vehicle body environmental sensor, to output an optimal adaptive following-up visual driving area, thereby improving safety and comfort during driving.

The invention claimed is:

1. An adaptive LED multi-module headlamp with integrated dipped beam and high beam, comprising a dipped beam and high beam following-up adaptive beam pattern control system, a light compensation system, and a color temperature control system, the dipped beam and high beam following-up adaptive beam pattern control system comprising a LED light source module array, the LED light source module array comprising a number of LED light source modules including more than two LED light source modules parallel to each other which forming a direct light source, axes of the more than two LED light source modules paralleling with the center of vehicle body, and including more than one LED light source module arranged outside the direct light source which forming a steering light source, angle between axes of the more than one LED light source module and the center of vehicle body being acute angle, the angle between axes of the LED light module of the steering light source and vehicle body increasing in turn from inside out; the direct light source being more close to the center of vehicle body than the steering light source; the direct light source lighted during normal driving; one or more LED light source modules of the direct light source closed to weaken light intensity of the direct light source while vehicles crossing each other at night; one or more LED light source modules of the steering light source lighted while vehicle turning at night; the LED light source module comprising a first LED light source, a first surface reflector worked with the first LED light source, a second LED light source, a second surface reflector worked with the second LED light source and convex lens, if the first LED light source lighted separately, a dipped beam pattern lighted by the LED light source module, if the first LED light source and the second LED light source lighted simultaneously, a high beam pattern lighted by the LED light source module; the light compensation system comprising a number of upper polarizing-assisted light filling units above the dipped beam and high beam following-up adaptive beam pattern control system and a number of lower polarizing-assisted light filling units below the dipped beam and high beam following-up adaptive beam pattern control system; the upper polarizing-assisted light filling unit comprising an upper polarizing LED light source and an upper polarizing reflecting surface, the upper polarizing LED light source being at the bottom of the upper polarizing reflecting surface, light emitted from the upper polarizing LED light source reflected by the upper polarizing reflecting surface, so that there being an angle of 6~10° between distribution area of the angle at which light emitted and the ground, to compensate the illumination area during slowing down, driving under heavy load or driving uphill; the lower polarizing-assisted light filling unit comprising an lower polarizing LED light source and an lower polarizing reflecting surface, the lower polarizing LED light source being on the top of the lower polarizing reflecting surface, light emitted from the lower polarizing LED light source reflected by the lower polarizing reflecting surface, so that there being an angle of 6~10° between distribution area of the angle at which light emitted and the ground, to compensate the illumination area during slowing down and driving downhill.

2. The adaptive LED multi-module headlamp with integrated dipped beam and high beam according to claim 1, wherein the first LED light source and second LED light source both comprising a LED chip, a circuit board and a radiator, the circuit board mounted on the radiator, a hole being at the center of the circuit board, a mounting plane formed on the radiator in the position corresponding to the hole of the circuit board, the LED chip fixed on the mounted plane; pads arranged on surface of the circuit board, the LED chip connected with the pads through wire; the hole of the circuit board and the mounting plane forming a groove, the groove filled with fluorescent silica gel.

3. The adaptive LED multi-module headlamp with integrated dipped beam and high beam according to claim 1, wherein the LED light source module array consisting of seven LED light source module groups, three of which being a direct light source, four of which being a steering light source.

4. The adaptive LED multi-module headlamp with integrated dipped beam and high beam according to claim 3, wherein angles between the four LED light source groups of the steering light source and the center of vehicle body being 13~17°, 17~21°, 28~32° and 40~44° in turn from inside out.

5. The adaptive LED multi-module headlamp with integrated dipped beam and high beam according to claim 1, wherein the color temperature control system comprising a number of front fog lamp LED light sources, the front fog lamp LED light source comprising a LED of 2700K color temperature, a LED of 7000K color temperature and a fog lamp reflector.

6. The adaptive LED multi-module headlamp with integrated dipped beam and high beam according to claim 1, wherein the headlamp further comprising a closed loop adaptive following-up control system including a vehicle body sensor group, a vehicle body master control MCU and headlamp AFS subsystem AU, the vehicle body sensor group connected with the vehicle body master control MCU, the vehicle body master control MCU controlling the dipped beam and high beam following-up adaptive beam pattern control system, the light compensation system and the color temperature control system through the headlamp AFS subsystem AU; the vehicle body sensor group consisting of a vehicle body speed sensor, a vehicle body dip angle or rotation angle sensor, a vehicle body heavy load sensor, a vehicle body road vibration sensor, a steering wheel steering angle sensor, a rainfall sensor, a haze or snow sensor and a downtown environmental sensor.

\* \* \* \* \*